United States Patent
Assali et al.

(10) Patent No.: US 10,778,527 B2
(45) Date of Patent: Sep. 15, 2020

(54) METHODS, SYSTEMS, AND COMPUTER READABLE MEDIA FOR PROVIDING A SERVICE PROXY FUNCTION IN A TELECOMMUNICATIONS NETWORK CORE USING A SERVICE-BASED ARCHITECTURE

(71) Applicant: Oracle International Corporation, Redwood Shores, CA (US)

(72) Inventors: Tarek Assali, Wellesley, MA (US); Sridhar Karuturi, Raleigh, NC (US); Jeffrey Alan Craig, Durham, NC (US); Manish Kumar Gupta, Pennington, NJ (US); Sameh Naguib, Plano, TX (US)

(73) Assignee: Oracle International Corporation, Redwood Shores, CA (US)

( * ) Notice: Subject to any disclaimer, the term of this patent is extended or adjusted under 35 U.S.C. 154(b) by 43 days.

(21) Appl. No.: 16/176,920

(22) Filed: Oct. 31, 2018

(65) Prior Publication Data
US 2020/0136911 A1    Apr. 30, 2020

(51) Int. Cl.
*H04L 12/24*    (2006.01)
(52) U.S. Cl.
CPC ...... *H04L 41/0893* (2013.01); *H04L 41/5032* (2013.01); *H04L 41/5058* (2013.01); *H04L 41/5096* (2013.01)
(58) Field of Classification Search
CPC ............. H04L 41/0893; H04L 41/5096; H04L 41/5032; H04L 41/5058
See application file for complete search history.

(56) References Cited

U.S. PATENT DOCUMENTS 5,719,861 A    2/1998    Okanoue
6,105,034 A    8/2000    Buckler
(Continued)

FOREIGN PATENT DOCUMENTS

CN    1700694 A    11/2005
CN    101151861 A    3/2008
(Continued)

OTHER PUBLICATIONS

Technical Specification, 5G; Procedures for the 5G System (3GPP TS 23.502 version 15.2.0 Release 15) ETSI TS 123 502 V15.2.0 (Jun. 2018) (Year: 2018).*
(Continued)

*Primary Examiner* — Kostas J Katsikis
(74) *Attorney, Agent, or Firm* — Jenkins, Wilson, Taylor & Hunt, P.A.

(57) ABSTRACT

An example system includes a service proxy controller and a number of service proxy workers. The service proxy controller is configured for providing routing policies for a telecommunications network core. The telecommunications network core includes network functions communicating using a service-based architecture. Each service proxy worker is configured for routing telecommunications network core messages between a respective subset of the network functions by consuming the routing policies from the service proxy controller and enforcing the routing policies from the service proxy controller. Each service proxy worker is configured for providing network status reports to the service proxy controller based on the telecommunications network core messages.

19 Claims, 9 Drawing Sheets

(56) References Cited

U.S. PATENT DOCUMENTS

| | | |
|---|---|---|
| 6,366,577 B1 | 4/2002 | Donovan |
| 6,385,198 B1 | 5/2002 | Ofek et al. |
| 6,404,746 B1 | 6/2002 | Cave et al. |
| 6,735,291 B1 | 5/2004 | Schmid et al. |
| 7,308,499 B2 | 12/2007 | Chavez |
| 7,742,421 B2 | 6/2010 | Bantukul et al. |
| 7,929,419 B2 | 4/2011 | Sprague |
| 8,023,482 B2 | 9/2011 | Gong et al. |
| 8,300,637 B1 | 10/2012 | Bennett, III et al. |
| 8,498,202 B2 | 7/2013 | Kanode et al. |
| 8,879,431 B2 | 11/2014 | Ridel et al. |
| 8,954,080 B2 | 2/2015 | Janakiraman et al. |
| 9,071,512 B2 | 6/2015 | Marsico |
| 10,285,155 B1 | 5/2019 | Dodd-Noble et al. |
| 10,291,539 B2 | 5/2019 | Krishan et al. |
| 10,299,128 B1* | 5/2019 | Suthar ..................... H04L 9/30 |
| 10,361,843 B1* | 7/2019 | Suthar ................. G06Q 20/10 |
| 10,595,256 B1* | 3/2020 | Marupaduga ......... H04W 36/26 |
| 10,609,154 B2* | 3/2020 | Talebi Fard .......... H04L 67/141 |
| 10,616,934 B2* | 4/2020 | Talebi Fard ........... H04W 8/18 |
| 2001/0039585 A1 | 11/2001 | Primak et al. |
| 2003/0086410 A1 | 5/2003 | Eikkula |
| 2004/0088424 A1 | 5/2004 | Park et al. |
| 2004/0114744 A1 | 6/2004 | Trossen |
| 2004/0158606 A1 | 8/2004 | Tsai |
| 2004/0205190 A1 | 10/2004 | Chong et al. |
| 2004/0221061 A1 | 11/2004 | Chavez |
| 2005/0207402 A1 | 9/2005 | Kobayashi et al. |
| 2005/0227685 A1 | 10/2005 | Costa Requena et al. |
| 2005/0232407 A1 | 10/2005 | Craig et al. |
| 2006/0010321 A1 | 1/2006 | Nakamura et al. |
| 2006/0069776 A1 | 3/2006 | Shim et al. |
| 2006/0101143 A1 | 5/2006 | Garcia et al. |
| 2006/0104210 A1 | 5/2006 | Nielsen |
| 2006/0253563 A1 | 11/2006 | Yang et al. |
| 2007/0156909 A1 | 7/2007 | Osborn et al. |
| 2007/0191004 A1 | 8/2007 | Yamakawa et al. |
| 2008/0280623 A1 | 11/2008 | Danne et al. |
| 2009/0185494 A1 | 7/2009 | Li et al. |
| 2009/0268723 A1 | 10/2009 | Przybysz |
| 2010/0261490 A1 | 10/2010 | Berry et al. |
| 2012/0079082 A1 | 3/2012 | Ding et al. |
| 2013/0029708 A1* | 1/2013 | Fox ....................... H04W 24/02 455/509 |
| 2013/0039176 A1 | 2/2013 | Kanode et al. |
| 2015/0016266 A1 | 1/2015 | Dumitrescu et al. |
| 2015/0039560 A1 | 2/2015 | Barker et al. |
| 2015/0263987 A1 | 9/2015 | Klein et al. |
| 2016/0142324 A1 | 5/2016 | Vihtari et al. |
| 2016/0164788 A1 | 6/2016 | Goel et al. |
| 2016/0315743 A1 | 10/2016 | Nagaraj et al. |
| 2016/0352588 A1* | 12/2016 | Subbarayan ......... H04L 41/0813 |
| 2018/0159780 A1 | 6/2018 | Essigmann et al. |
| 2018/0262592 A1 | 9/2018 | Zandi et al. |
| 2018/0324646 A1* | 11/2018 | Lee ...................... H04W 36/38 |
| 2018/0343567 A1* | 11/2018 | Ashrafi ................. H04B 7/024 |
| 2019/0045351 A1* | 2/2019 | Zee ........................ H04W 8/06 |
| 2019/0075552 A1* | 3/2019 | Yu ........................ H04W 48/20 |
| 2019/0116486 A1* | 4/2019 | Kim .................... H04W 64/003 |
| 2019/0116521 A1* | 4/2019 | Qiao ..................... H04W 28/06 |
| 2019/0158364 A1* | 5/2019 | Zhang ................. H04L 41/145 |
| 2019/0173740 A1* | 6/2019 | Zhang .................... H04L 43/08 |
| 2019/0174561 A1* | 6/2019 | Sivavakeesar ........ H04W 76/10 |
| 2019/0182875 A1* | 6/2019 | Talebi Fard .......... H04W 76/11 |
| 2019/0191348 A1* | 6/2019 | Futaki .................. H04W 36/14 |
| 2019/0191467 A1* | 6/2019 | Dao ...................... H04W 76/11 |
| 2019/0223093 A1* | 7/2019 | Watfa .................... H04W 36/06 |
| 2019/0261244 A1* | 8/2019 | Jung ........................ H04L 1/20 |
| 2019/0306907 A1* | 10/2019 | Andreoli-Fang ... H04L 45/5041 |
| 2019/0313236 A1* | 10/2019 | Lee ..................... H04L 41/0893 |
| 2019/0313437 A1* | 10/2019 | Jung .................. H04W 74/006 |
| 2019/0313469 A1* | 10/2019 | Karampatsis ..... H04W 72/1242 |
| 2019/0335002 A1* | 10/2019 | Bogineni ................ H04L 67/14 |
| 2019/0335534 A1* | 10/2019 | Atarius ................... H04W 4/08 |
| 2019/0342921 A1* | 11/2019 | Loehr ................... H04L 5/0044 |
| 2019/0349901 A1* | 11/2019 | Basu Mallick ... H04W 72/1273 |
| 2019/0357092 A1* | 11/2019 | Jung ................. H04W 36/0077 |
| 2019/0380031 A1* | 12/2019 | Suthar .................. G06Q 20/325 |
| 2019/0394624 A1* | 12/2019 | Karampatsis ......... H04W 76/15 |
| 2019/0394833 A1* | 12/2019 | Talebi Fard .......... H04W 28/08 |
| 2020/0008069 A1* | 1/2020 | Zhu ....................... H04W 48/10 |
| 2020/0028920 A1* | 1/2020 | Livanos ............... H04W 48/18 |
| 2020/0045753 A1* | 2/2020 | Dao ..................... H04W 48/16 |
| 2020/0045767 A1* | 2/2020 | Velev ..................... H04W 8/24 |
| 2020/0053670 A1* | 2/2020 | Jung ................. H04W 56/0015 |
| 2020/0053724 A1* | 2/2020 | Molavianjazi ...... H04W 52/281 |
| 2020/0053828 A1* | 2/2020 | Bharatia ............. H04W 68/005 |
| 2020/0059856 A1* | 2/2020 | Cui ...................... H04W 48/14 |
| 2020/0084663 A1* | 3/2020 | Park ....................... H04W 8/08 |
| 2020/0092423 A1* | 3/2020 | Qiao .................... H04W 76/25 |
| 2020/0092424 A1* | 3/2020 | Qiao .................... H04M 15/65 |

FOREIGN PATENT DOCUMENTS

| | | | |
|---|---|---|---|
| CN | 200780036907.1 | 2/2012 | |
| EP | 0 950 952 A2 | 10/1999 | |
| EP | 1 175 074 A2 | 1/2002 | |
| IN | 333811 | 3/2020 | |
| JP | 2006-279805 A | 10/2006 | |
| KR | 10-2004-0057858 A | 7/2004 | |
| KR | 10-2005-0002335 A | 1/2005 | |
| KR | 10-2006-0025869 A | 3/2006 | |
| WO | WO 00/69140 | 11/2000 | |
| WO | WO 01/13228 A2 | 2/2001 | |
| WO | WO 2008/019056 A2 | 2/2008 | |
| WO | WO 2009/018418 A2 | 2/2009 | |
| WO | WO 2011/100629 A2 | 8/2011 | |
| WO | WO-2018174021 A1 * | 9/2018 | ............. H04W 8/12 |
| WO | WO-2018174516 A1 * | 9/2018 | ........... H04W 28/04 |
| WO | WO-2019034609 A1 * | 2/2019 | ............. H04W 8/20 |
| WO | WO 2019/062596 A1 | 4/2019 | |
| WO | WO 2019/076273 A1 | 4/2019 | |
| WO | WO-2019220172 A1 * | 11/2019 | ........... G06F 21/629 |

OTHER PUBLICATIONS

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

Scholl et al., "An API First Approach to Microservices Development," Oracle, https://blogs.oracle.com/developers/an-api-first-approach-to-microservices-development, pp. 1-12 (Nov. 8, 2017).

Commonly-assigned, co-pending U.S. Appl. No. 16/369,691 for "Methods, System, and Computer Readable Media for Network Function (NF) Topology Synchronization," (Unpublished, filed Jul. 31, 2019).

Commonly-assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).

"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).

"3rd Generation Partnership Project; Technical Specification Group Network and Terminals; 5G Systems; Network Function Repository Services; Stage 3 (Release 15)", 3GPP TS 29.510, V15.2.0, pp. 1-113 (Dec. 2018).

"3rd Generation Partnership Project; Technical Specification Group Network and Terminals; 5G Systems; Principles and Guidelines for Services Definition; Stage 3 (Release 15)", 3GPP TS 29.501, V15.2.0, pp. 1-66 (Dec. 2018).

"3rd Generation Partnership Project; Technical Specification Group Services and System Aspects; Study on Enhancements to the Service-Based Architecture (Release 16)", 3GPP TR 23.742, V16.0.0, pp. 1-131 (Dec. 2018).

"5G; 5G System; Network function repository services; Stage 3 (3GPP TS 29.510 version 15.1.0 Release 15)," ETSI TS 129 510, V15.1.0, pp. 1-87 (Oct. 2018).

(56) References Cited

OTHER PUBLICATIONS

"5G; 5G System; Unified Data Repository Services; Stage 3 (3GPP TS 29.504 version 15.1.0 Release 15)," ETSI TS129 504, V15.1.0, pp. 1-26 (Oct. 2018).
Mayer, "RESTful APIs for the 5G Service Based Architecture," Journal of ICT, vol. 6_1&2, pp. 101-116 (2018).
"Cisco Ultra 5G Packet Core Solution," Cisco, White Paper, pp. 1-11 (2018).
"5G Service Based Architecture (SBA)," 5G, pp. 1-61 (downloaded Dec. 24, 2018).
Preston-Werner, "Semantic Versioning 2.0.0", Oracle, pp. 1-5 (Jun. 2013).
Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).
"Class of Service Feature Guide (Routers and EX9200 Switches)," Junos® OS, Juniper Networks, pp. 1-1530 (Apr. 10, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
"Oracle Communications Diameter Signaling Router," Release Notice, Release 8.3, E93179 Revision 02, Oracle, pp. 1-98 (Dec. 2018).
"Addressing 5G Network Function Requirements," Intel® FPGAs and Intel PAC 5G QoS and IPSec Benchmarking, White Paper, pp. 1-8 (Oct. 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
Benacer et al., "A High-Speed Traffic Manager Architecture for Flow-Based Networking," pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for use mobility awareness, Definiation of 5G-XHaul control plane requirements," European Commission, 5G-XHaul, pp. 1-107 (Jun. 31, 2016).
Commonly-assigned, co-pending U.S. Appl. No. 16/601,380 for "Methods, Systems, and Computer Readable Media for Distributing Network Function (NF) Topology Information Among Proxy Nodes and Using the NF Topology Information for Inter-Proxy Node Message Routing," (Unpublished, filed Oct. 14, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
Hearing Notice for Indian Application No. 1106/CHENP/2009 (May 28, 2015).
Notice of Allowance and Fee(s) Due for U.S. Appl. No. 13/197,566 (dated Feb. 20, 2015).
Notification of the Second Office Action for Chinese Application No. 201180013381.1 (dated Feb. 10, 2015).
Notification of Reexamination for Chinese Application No. 200880109633.9 (dated Jan. 29, 2015).
Extended European Search Report for European Patent Application No. 08796925.9 (dated Nov. 21, 2014).
Non-Final Office Action for U.S. Appl. No. 13/197,566 (dated Aug. 27, 2014).
Notification of Reexamination for Chinese Patent Application No. 200880109633.9 (dated Jul. 28, 2014).
Notification of the First Office Action for Chinese Application No. 201180013381.1 (dated Jun. 5, 2014).
First Examination Report for Indian Patent Application No. 1106/CHENP/2009 (dated Jan. 28, 2014).
Extended European Search Report for European Application No. 07836478.3 (dated Nov. 18, 2013).
Notice of Allowance and Fee(s) Due for U.S. Appl. No. 13/026,153 (dated Apr. 15, 2013).
Communication of European Publication No. and Information on the Application of Article 67(3) EPC for European Patent Application No. 11742923.3 (dated Nov. 21, 2012).
First Office Action for Chinese Patent Application No. 200820109633.9 (dated May 3, 2012).
Notification of Transmittal of the International Search Report and the Written Opinion of the International Searching Authority, or the Declaration for International Application No. PCT/US2011/024645 (dated Oct. 28, 2011).
Notice of Allowance for U.S. Appl. No. 11/510,284 (dated Dec. 9, 2010).
Chinese Office Action for Chinese Patent Application No. 200780036907.1 (dated Oct. 11, 2010).
Final Official Action for U.S. Appl. No. 11/510,284 (dated Jun. 22, 2010).
Official Action for U.S. Appl. No. 11/510,284 (dated Feb. 23, 2010).
Notice of Allowance and Fee(s) Due for U.S. Appl. No. 12/183,406 (dated Feb. 12, 2010).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Final Official Action for U.S. Appl. No. 11/510,284 (dated Jul. 9, 2009).
Notification of Transmittal of the International Search Report and the Written Opinion of the International Searching Authority, or the Declaration for International Application No. PCT/US2008/071718 (dated Jan. 28, 2009).
Official Action for U.S. Appl. No. 11/510,284 (dated Dec. 24, 2008).
Notification of Transmittal of the International Search Report and the Written Opinion of the International Searching Authority, of the Declaration for International Application No. PCT/US07/17329 (dated Feb. 15, 2008).
A. B. Roach, "Session Initiation Protocol (SIP)-Specific Event Notification," dynamicsoft, Network Working Group, pp. 1-38 (Jun. 2002).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, pp. 1-153 (Mar. 1999).
Handley et al., "SDP: Session Description Protocol," IETF RFC 2327, pp. 1-42 (Apr. 1998).
S. Paul et al., "Reliable Multicast Transport Protocol (RMTP)," IEEE Journal on Selected Areas in Communications, vol. 15, No. 3, pp. 407-421 (Apr. 1997).
Lin et al., "A Reliable Multicast Transport Protocol," IEEE INFOCOM, pp. 1414-1424 (1996).
Notification of Transmittal of the International Search Report and the Written Opinion of the International Searching Authority, or the Declaration for International Application Serial No. PCT/US2019/053912 (Dec. 18, 2019).
Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).
"Diameter anf Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-4 (Aug. 22, 2019).

(56) References Cited

OTHER PUBLICATIONS

"CPS vDRA Configuration Guide," Release 18.3.0 (Restricted Release)(1), Cisco, pp. 1-130 (Sep. 14, 2018).

"How to Do Rate Limiting of Diameter Messages Using NetScaler," Citrix Systems Inc., pp. 1-3 (Sep. 4, 2018).

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"Pseudo-CR on Service Discovery and Registration using NRF service," Ericsson, 3GPP TSG CT4 Meeting #79, 3GPP TR 29.891-v0.3.0, pp. 1-4 (Aug. 21-25, 2017).

"Multi-Layer Security Protection for Signaling Networks," Oracle Communications, Oracle white paper, pp. 1-9 (Jan. 2016).

Fajardo et al., "Diameter Based Protocol," Internet Engineering Task Force (IETF) Request for Comments: 6733, pp. 1-152 (Oct. 2012).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

"3rd Generation Partnetship Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).

Penttinen, "5G Explained: Security and Deployment of Advanced Mobile Communications," Chapter 6, Section 6.3.8 NRF, 2 pages (Feb. 2019).

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).

Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).

Carlton et al., "HTTP and DNS in a 5G World," https://www.computerworld.com/article/3204594/http-and-dns-in-a-5g-world.html, pp. 1-5 (Jun. 30, 2017).

Kantola et al., "Policy-based communications for 5G mobile with customer edge switching," Security and Communication Networks, vol. 9, pp. 3070-3082 (2016).

Gulbrandsen et al., "A DNS RR for specifying the location of services (DNS SRV)," RFC 2782, pp. 1-12 (Feb. 2000).

\* cited by examiner

METHODS, SYSTEMS, AND COMPUTER READABLE MEDIA FOR PROVIDING A SERVICE PROXY FUNCTION IN A TELECOMMUNICATIONS NETWORK CORE USING A SERVICE-BASED ARCHITECTURE

TECHNICAL FIELD

The subject matter described herein relates to telecommunications network cores using a service-based architecture. More particularly, the subject matter described herein relates to methods, systems, and computer readable media for providing a service proxy function in a telecommunications network core using a service-based architecture.

BACKGROUND

The $3^{rd}$ Generation Partnership Project (3GPP) is a collaboration between groups of telecommunications standards associations. The 3GPP defined mobile phone system specifications for telecommunications networks including 3G, 4G, and Long Term Evolution (LTE) networks. The next generation network for 3GPP is the 5G network. The 5G specifications target high data rates, reduced latency, energy saving, cost reduction, higher system capacity, and increasing numbers of connected devices.

The 3GPP has defined a service-based architecture for its next generation 5G core network. In a service-based architecture, services are provided to software components by application components, typically through a communication protocol over a data communications network. A service can be, e.g., a discrete function that can be accessed remotely and consumed and updated independently of other services in the system. Different services can be used together to provide the functionality of a larger functional system such as a software application. The service-based architecture can integrate distributed and separately-maintained software components.

In order to enable service consumers to communicate with service producers, consumers are expected to discover producers via a discovery service and then directly communicate with the producers. For example, in the 5G core network, services perform these functions using RESTful APIs over HTTP/2. While the approach defined by 3GPP works, it places a lot of the burden on the service consumers and producers to implement networking functionality such as service discovery, load balancing, overload control, circuit breaker, retries, timeouts, and the like.

Accordingly, there exists a need for methods, systems, and computer readable media for providing a service proxy function in a telecommunications network core using a service-based architecture.

SUMMARY

The subject matter described herein includes methods, systems, and computer readable media for providing a service proxy function in a telecommunications network core using a service-based architecture. An example system includes at least one service proxy controller and a number of service proxy workers. The service proxy controller is configured for providing routing policies for the telecommunications network core. The telecommunications network core includes network functions communicating using a service-based architecture. Each service proxy worker is configured for routing telecommunications network core messages between a respective subset of the network functions by consuming the routing policies from the service proxy controller and enforcing the routing policies from the service proxy controller. Each service proxy worker is configured for providing network status reports to the service proxy controller based on the telecommunications network core messages.

An example method for providing a service proxy function includes providing, from a service proxy controller implemented on at least one processor, routing policies for a telecommunications network core, the telecommunications network core including network functions communicating using a service-based architecture. The method includes routing, at each service proxy worker of a number of service proxy workers implemented on the at least one processor, telecommunications network core messages between a respective subset of the network functions by consuming the routing policies from the service proxy controller and enforcing the routing policies from the service proxy controller. The method includes providing, at each service proxy worker, network status reports to the service proxy controller based on the telecommunications network core messages.

In some examples, providing routing policies includes performing load balancing between at least a first subset of network functions based on the network status reports from the service proxy workers. In some examples, routing telecommunications network core messages includes re-routing, at the service proxy worker, at least a first telecommunications network core message destined for a first network function based on a health status indicator for the first network function. In some examples, routing telecommunications network core messages includes re-trying, at the service proxy worker, a failed transmission of a first telecommunications network core message from a first network function to a second network function.

In some examples, the service proxy workers are deployed alongside instances of the network functions in a distributed computing system, and routing telecommunications network core messages includes acting as a default outbound proxy for the instances of the network functions. In some examples, providing routing policies for the telecommunications network core includes providing a traffic prioritization policy, and enforcing the routing policies includes shedding lower priority network traffic in response to detecting an overload condition according to the traffic prioritization policy.

In some examples, providing network status reports includes providing one or more of: request and response counts for each network function; a message rate for each network function; and an average transmission latency for each network function. In some examples, the service proxy controller is configured for determining a network load for at least a first network function based on: capacity information published by the first network function during registration; load information published by the first network function; and a first network status report characterizing the network load of the first network function.

In some examples, the telecommunications network core is a 3rd Generation Partnership Project (3GPP) 5G telecommunications network core, and the network functions include at least an access and mobility management function (AMF), a policy control function (PCF), a unified data management (UDM) function, a session management function (SMF), and a network slice selection function (NSSF). In some examples, providing routing policies for the telecommunications network core includes receiving network function status information from a network function repository function (NRF) and providing additional network function status information to the NRF.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for providing a service proxy function in a telecommunications network core using a service-based architecture are disclosed. In particular, the disclosed subject matter presents a distributed service proxy function using at least one service proxy controller and a number of service proxy workers.

The 3GPP 5G specifications significantly change the way that components in the telecommunication network core communicate with each other. The core network in 5G follows a service-based architecture where network elements advertise and provide services which can be consumed using REST APIs by other network elements in the telecommunications network core. This allows for the adoption of web scale technologies and software in telecommunications networks.

In the 5G architecture, the focus is on loosely coupled services as opposed to tightly coupled functions and point-to-point interfaces. HTTP/2 is used as a service-based application layer protocol. The 5G architecture supports native control and user plane separation. The 5G architecture supports the unified data management framework, an expanded and unified policy framework, and an expanded network exposure functionality.

Web scale technologies often rely primarily on open source software and bring in significant amount of automation, e.g., especially in the deployment and operational aspects of implementing a system. Web scale technology solutions are based on informational elements present in messages below the telecommunications network core layer. The service proxy function described in this specification brings telecommunications-awareness to networking components in a telecommunications network core and can help to resolve issues such as congestion control, traffic prioritization, overload control, optimized routing, and others.

Figure 1:
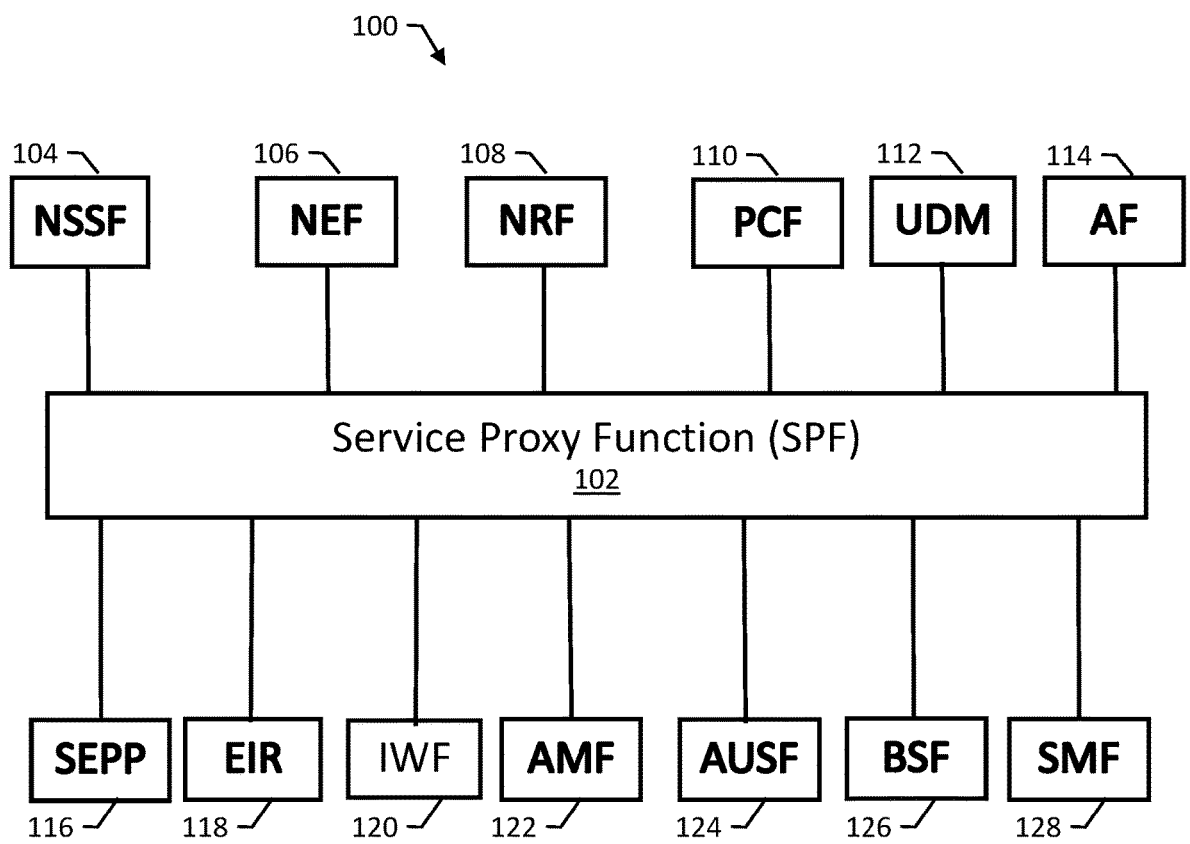
FIG. 1 is a block diagram illustrating an example telecommunications network core that uses a service-based architecture.

FIG. 1 is a block diagram illustrating an example telecommunications network core 100 that uses a service-based architecture. Telecommunications network core 100 can be, e.g., a 3GPP 5G telecommunications network core. As shown in FIG. 1, telecommunications network core 100 includes a service proxy function 102 and a number of network functions communicating with each other using service proxy function 102.

The networks functions illustrated in FIG. 1 are examples of network functions in telecommunications network core 100. Other types of appropriate network functions can be included, and in some examples, telecommunications network core 100 will include fewer network functions. As shown in FIG. 1, telecommunications network core 100 includes a network slice selection function (NSSF) 104, a network exposure function (NEF) 106, a network function repository function (NRF) 108, a policy control function (PCF) 110, a unified data management (UDM) function 112, an application function (AF) 114, a security edge protection proxy (SEPP) 116, an EIR 118, an interworking function (IWF) 120, an access and mobility management function (AMF) 122, an authentication server function (AUSF), a bootstrapping server function (BSF) 126, and a session management function (SMF) 128.

Some of the network functions shown in FIG. 1 are used for 5G-4G interworking. For example, NSSF 104, NEF 106, NRF 108, SEPP 116, EIR 118, IWF 120, and BSF 126 can be used to facilitate 5G-4G interworking.

Service proxy function 102 can be deployed in a cloud computing environment along side of the network functions to provide various services to facilitate a service-based architecture, e.g., routing control, resiliency, and observability to telecommunications network core 100. Service proxy function 102 provides, generally, a service mesh solution to telecommunications network core 100, thereby alleviating various computation burdens from the network functions and reducing the risk of network errors resulting from compliance with the service-based architecture.

In general, service proxy function 102 is a dedicated common service for handling communication between network functions. Service proxy function 102 can be implemented as a software layer that is separate and shared by other services deployed in a cloud computing environment. Service proxy function 102 offloads inter-service communication concerns from network functions and makes inter-service communication safe, fast, and reliable.

In some examples, service proxy function 102 provides one or more of the following advantages to services in telecommunications network core 100:

Enables uniform visibility and control of inter-service communication flows

Has capabilities such as circuit-breaking, latency-aware load-balancing, eventually-consistent service discovery, transaction retries, and transaction deadlines Provides both point-wise resilience and service-wise resilience Implements a control plane and a data plane In some examples, NRF 108 and service proxy function 102 are combined or configured to communicate with one another to facilitate certain tasks such as load balancing. NRF 108 can store real-time information on, for example:

Failed network functions or non-responsive network functions

Load conditions of each network function

Network function response times

Network function connection health

Storing such information at NRF 108 can lead to better network function selection decision making at NRF 108. NRF 108 can also use such information to reduce initial service requests, e.g., by eliminating separate NRF queries. In some examples, combining NRF 108 and service proxy function 102 can enable dynamic re-routing of messages.

Service proxy function 102 can provide improved visibility of the overall health of telecommunications network core 100. It is critical for operators to have visibility into the health of the network. Some functions partially fulfill this need, e.g., in a limited capacity by providing the health of a slice. Service proxy function 102 can alleviate the need for additional monitoring functions to identify the failed or degraded network functions.

Service proxy function 102 can provide improved load balancing across available network functions by virtue of having a complete view of all the messages arriving for a given type of network function. Service proxy function 102 can support technology such as round robin, weighted round robin, transaction latency, and other appropriate load balancing based on current load and network function availability.

By leveraging its position in the network, service proxy function 102 can provide better routing control and bring resiliency to telecommunications network core 100. Service proxy function 102 relieves consumer network functions of remembering and interpreting complex routing rules associated with next hop selection and at the same time making re-routing decisions based on load conditions and health status of network functions.

In the absence of an alternate route, service proxy function 102 can quickly reject requests destined to a failed or degraded network function, thereby acting as a circuit breaker. This can prevent valuable resources at the consumer network functions from being tied up waiting for responses from providers. Service proxy function 102 can also attempt retries on behalf of the service consumer thereby relieving the service consumer of this burden and leaving it to focus on the application.

Service proxy function 102 can be useful to reduce connections to and from network functions. In the absence of service proxy function 102, network function instances would typically setup connections with every other network function instance. By being deployed along side network function instances and acting as an outbound proxy for the network function instances, service proxy function 102 eliminates the need for network function instances to setup direct connections between each other. Connections can be optimized such that each network function instance maintains a set of redundant connections to service proxy function 102 and uses those connections for all out bound requests.

Figure 2:
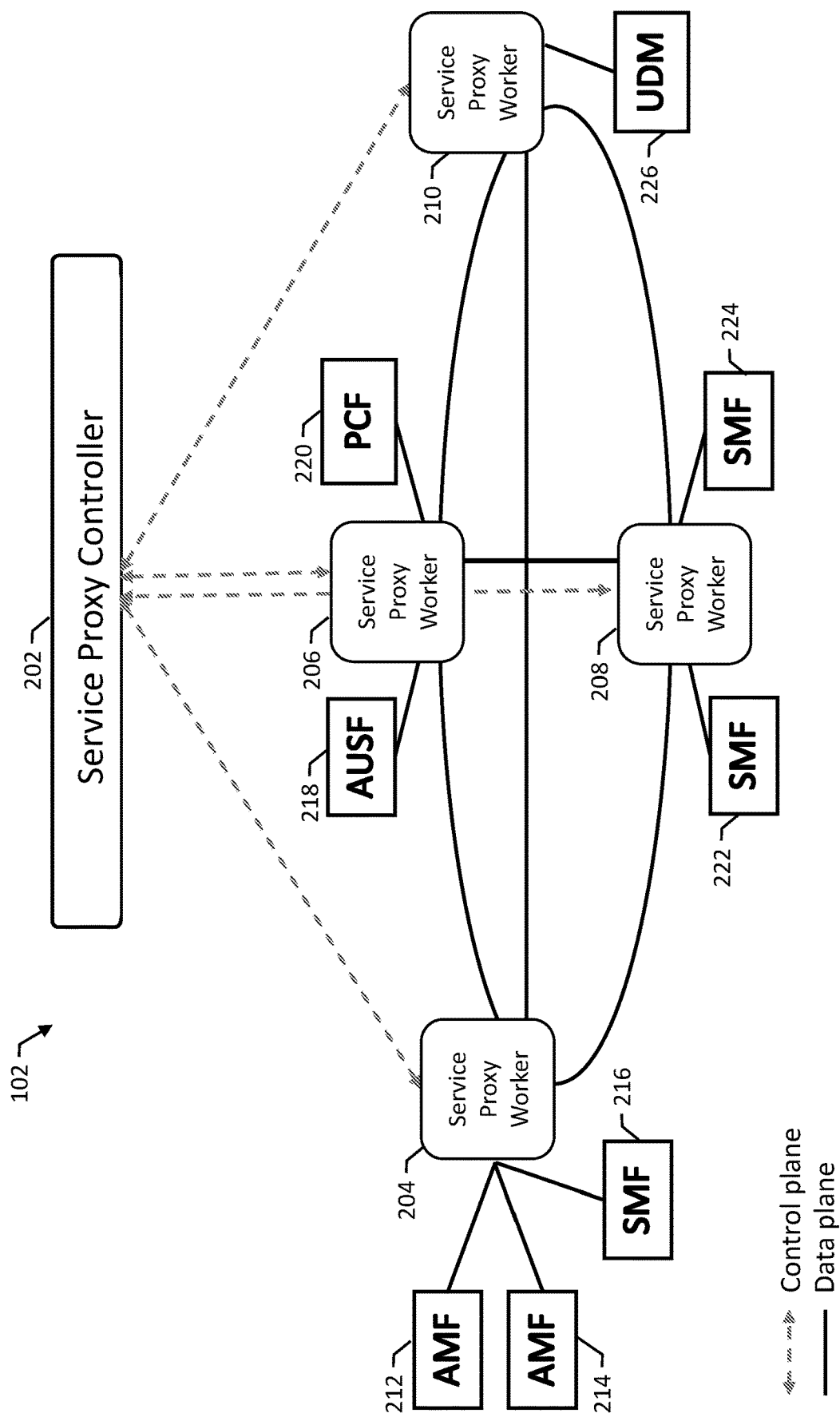
FIG. 2 is a block diagram illustrating an example implementation of the service proxy function.

FIG. 2 is a block diagram illustrating an example implementation of the service proxy function 102. Service proxy function 102 includes a service proxy controller 202 and a number of service proxy workers 204, 206, 208, and 210. Service proxy function 102 includes a control plane and a data plane as indicated in FIG. 2. Service proxy workers 204, 206, 208, and 210 using the control plane, and service proxy workers 204, 206, 208, and 210 communicate with each other to route telecommunications network core messages using the data plane.

Service proxy controller 202 can be implemented as a number of different instances of a service proxy controller function. In some examples, the functions of service proxy controller 202 are divided across a multitude of controller microservices.

Each service proxy worker is coupled to one or more network functions. Service proxy worker 204 is coupled to a first AMF instance 212, a second AMF instance 214, and a SMF instance 216. Service proxy worker 206 is coupled to an AUSF 218 instance and a PCF instance 220. Service proxy worker 208 is coupled to a first SMF instance 222 and a second SMF instance 224. Service proxy worker 210 is coupled to a UDM instance 226.

In some examples, service proxy function 102 is implemented such that no service proxy worker is coupled to any particular network function, and instead all service proxy workers collectively share a network identity and are used collectively as a default proxy by all network functions in the domain of the service proxy function instance. Cloud load balancer functions may be used to distribute network function consumer loads across the set of service proxy workers.

In operation, service proxy workers 204, 206, 208, and 210 facilitate communications between the network functions in accordance with the service-based architecture of telecommunications network core 100. Service proxy controller 202 is configured, by virtue of appropriate programming, for providing routing policies for telecommunications network core 100 to service proxy workers 204, 206, 208, and 210.

Each of service proxy workers 204, 206, 208, and 210 is configured, by virtue of appropriate programming, for routing telecommunications network core messages between network functions by consuming the routing policies from service proxy controller 202 and enforcing the routing policies from service proxy controller 202. Each of service proxy workers 204, 206, 208, and 210 is also configured for providing network status reports to service proxy controller 202 based on the telecommunications network core messages. Typically, a network function comprises a collection of services, and the network status is reported for each network function and each network function service. Service proxy controller 202 can use the network status reports to generate and push new routing policies.

The network status reports can include, e.g., notifications that network functions have failed or degraded, or other appropriate metrics, key performance indicators (KPIs), and reports related to message processing. For example, the network status reports can include request and response counts for each network function instance, or message rates or average transaction latency for each network function instance. The network status reports can include success and error counts. With this information service proxy controller 202 is in a unique position to provide a view of the network health and to provide routing policies based on current information.

Service proxy controller 202 and service proxy workers 204, 206, 208, and 210 are implemented using at least one processor and, in general, are implemented using a distributing computing system, e.g., a cloud computing system or other appropriate computing system. Service proxy function 102 can be deployed, e.g., as a default outbound proxy to network functions instances or as a side car in cloud native environments. Service proxy function 102 can provide one or more of the following benefits to telecommunications network core 100:

Improved Load Balancing
Routing Control & Resiliency—timeouts, retries & alternate routing
Rate Limiting—Ingress and Egress
Traffic Prioritization
Network visibility reports—metrics, KPIs, logging
HTTP/2 and payload mediation
Circuit Breaking
Canary and A/B testing
Traffic Shadowing—Message copy
Fault injection/Chaos testing In some examples, providing routing policies includes performing load balancing between at least a first subset of network functions based on the network status reports from service proxy workers 204, 206, 208, and 210. In some examples, routing telecommunications network core messages includes re-routing, at a service proxy worker, at least a first telecommunications network core message destined for a first network function based on a health status indicator for the first network function. In some examples, routing telecommunications network core messages includes re-trying, at a service proxy worker, a failed transmission of a first telecommunications network core message from a first network function to a second network function.

In some examples, service proxy workers 204, 206, 208, and 210 are deployed alongside instances of the network functions in a distributed computing system, and routing telecommunications network core messages includes acting as a default outbound proxy for the instances of the network functions. Alternatively, the network functions can configure service proxy workers 204, 206, 208, and 210 as an outbound proxy for inter-network function communications but not as the default proxy for all possible flows. In some examples, providing routing policies for telecommunications network core 100 includes providing a traffic prioritization policy, and enforcing the routing policies includes shedding lower priority network traffic in response to detecting an overload condition according to the traffic prioritization policy.

In some examples, providing network status reports includes providing one or more of: request and response counts for each network function; a message rate for each network function; and an average transmission latency for each network function. In some examples, service proxy controller 202 is configured for determining a network load for at least a first network function based on: capacity information published by the first network function during registration; load information published by the first network function; and a first network status report characterizing the network load of the first network function.

Figure 3:
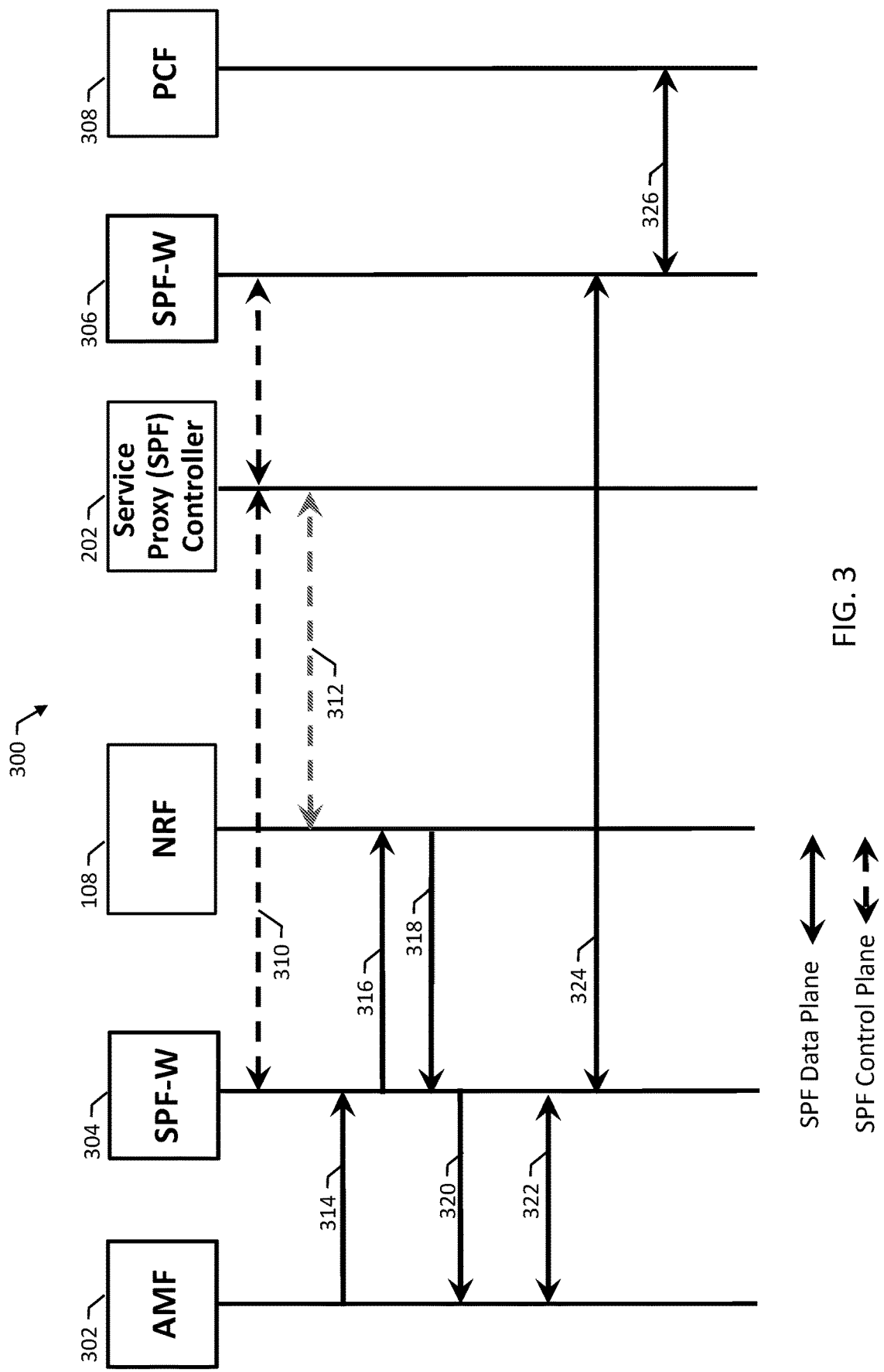
FIG. 3 is a signaling diagram illustrating an example message exchange for load-aware discovery and request routing.

FIG. 3 is a signaling diagram illustrating an example message exchange 300 for load-aware discovery and request routing. FIG. 3 shows an AMF instance 302, a service proxy worker 304, the NRF 108, the service proxy controller 202, another service proxy worker 306, and a PCF instance 308.

Load balancing across the available network functions in a service-based 5G core is primarily a function of NRF 108 and the logic implemented at the consumer network function. NRF 108 factors in the relative capacity and load information provided by the network functions during the network function discovery process.

Relative capacity information published to NRF 108: This is the information provided by the network function as part of network function registration or network function updates. The capacity being relative can create some confusion with respect to the interpretation of this value.

Load information published to NRF 108: This is the information provided by the network function as part of network function updates. The load information provided is valuable if it is updated frequently and consumed quickly. However, if there is significant amount of time between the updates, the load information may not be all that useful.

Based on the above information, NRF 108 can return (in response to a discovery request) multiple results in an ordered list based on the most preferred to the least preferred. However, the order loses value if the consumer network function cache this information for a significant amount of time as load information can change quickly by the second. There is also no standard around what kind of the load balancing strategy a consumer NF should use when it sees multiple results and this will result in vendors implementing their own strategies their by making is hard to achieve load balancing of the providers.

Service proxy controller 202 can provide valuable information to NRF 108 that may otherwise not be available to NRF 108. For example, service proxy controller 202 can report additional metrics and a more up to date status information of the network functions. The metrics reported by service proxy function 102 combined with view of the data at NRF 108 reported by the network functions provides a current load, i.e., a "true load" on the network function, which can lead to better network function selection (for discovery requests) as well as avoid providing stale results in response to discovery requests.

The "true load" factors in the following information for a given network function instance:

Capacity information published by the network function instance during a register operation
Load as reported by the network function instance to NRF 108 via an update operation
Messages per second being handled by the network function instance or a message rate relative to the load/capacity
Latency distribution per request/service type
Number of outstanding transactions
Error-response distribution Message exchange 300 begins with service proxy controller 202 sending messages 310 to push routing policies to service proxy workers 304 and 306. Service proxy controller 202 also exchanges messages 312 with NRF 108 to continuously update NRF 108 of current load information of network function instances.

AMF 302 sends a message 314 to service proxy worker 304 to discover an network service. For example, message 314 can specify NRF 108 as a destination and specify the type of network service as PCF. Service proxy worker 304 routes the message 316 to NRF 108.

NRF 108 selects an appropriate network function based on network loads determined in conjunction with service proxy controller 202. For example, NRF 108 can select PCF 308 because it currently is experiencing the lowest load among a pool of available PCFs. NRF 108 responds by sending a message 318 to service proxy worker 304 identifying PCF 308. Service proxy worker 304 routes the message 320 to AMF 302.

AMF 302 can then send a message 322 requesting service from PCF 308 to service proxy worker 304. Service proxy worker 304 routes the message 324 to service proxy worker 306. Service proxy worker 306 routes the message 326 to PCF 308.

Figure 4:
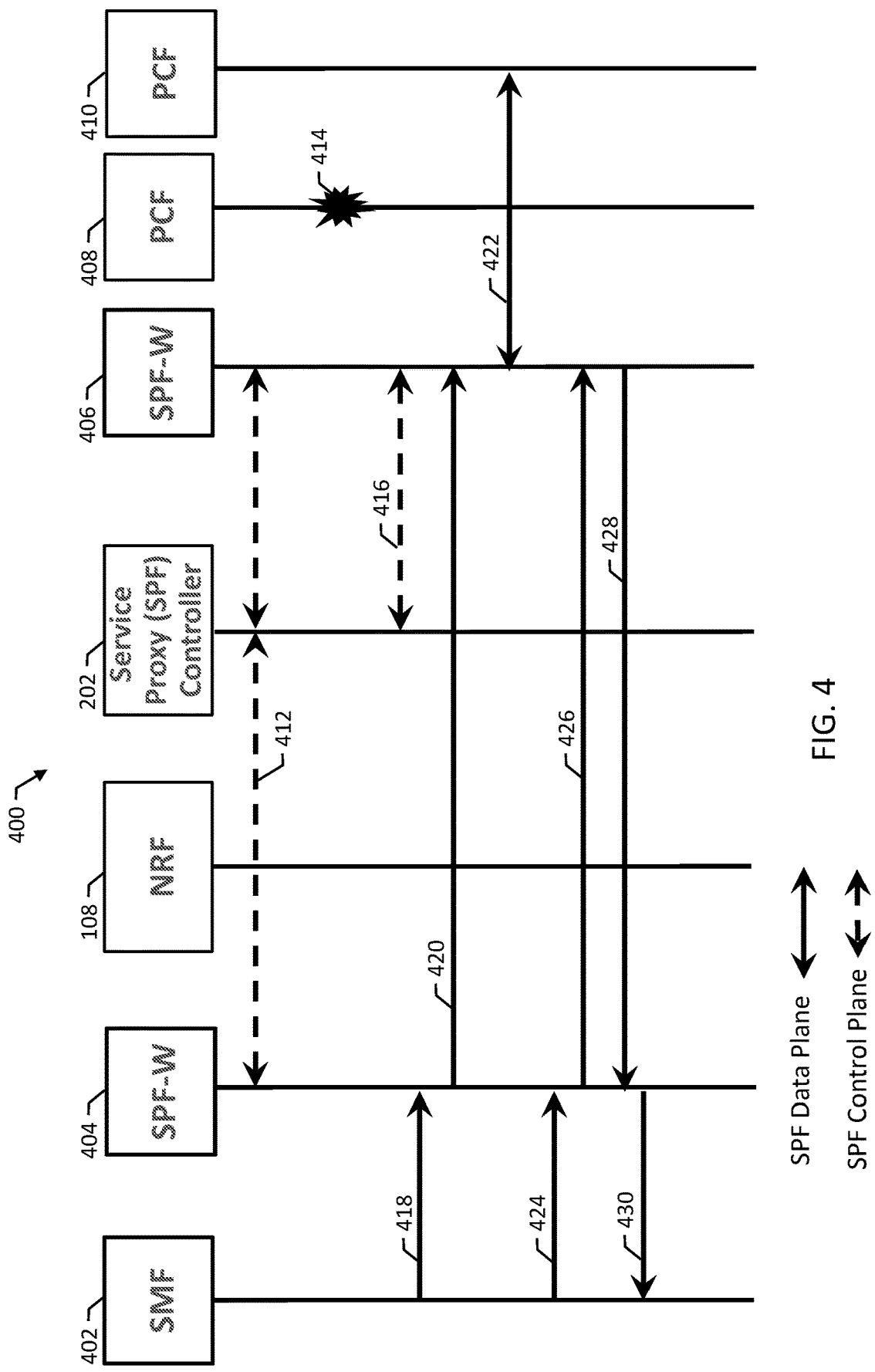
FIG. 4 is a signaling diagram illustrating an example message exchange for telecommunications-aware alternate routing.

FIG. 4 is a signaling diagram illustrating an example message exchange 400 for telecommunications-aware alternate routing. FIG. 4 shows an SMF instance 402, a service proxy worker 404, the NRF 108, the service proxy controller 202, another service proxy worker 406, a first PCF instance 308, and a second PCF instance 410.

Typically, the next hop selection is a function of NRF 108. Sometimes, NRF 108 may provide complex routing rules that a consumer network function has to interpret and process. Similarly, a consumer network function has to implement logic associated with alternate routing in the case of an error message from the provider or retry the request with the same provider in the case of a timeout.

To support these aspects of a service-based architecture, consumer network functions would have to implement logic that is not associated with the application or service the network function is providing but purely to handle the various routing issues. Service proxy function 102 can alleviate these concerns by handling routing, alternate routing, and/or retries, for example, as illustrated by message exchange 400.

Message exchange 400 begins with service proxy controller 202 sending messages 412 to push routing policies to service proxy workers 404 and 406. SMF 402 has discovered PCF 408; the discovery of PCF 408 is not shown. Then, PCF 408 fails.

Service proxy worker 406 detects the failure. Service proxy worker 406 and service proxy controller 202 exchange messages 416 in response to the failure. Messages 416 inform service proxy controller 202 of the failure and provide service proxy worker 406 with alternates from service proxy controller 202.

SMF 402 then sends a session creation request message 418 to create a session with PCF 408. Service proxy worker 404 routes the message 426 to service proxy worker 406. Service proxy worker 406 re-targets the creation request 422 to PCF 410.

In some cases, SMF 402 then sends a session update request message 424 to service proxy worker 404, addressed for PCF 408. Service proxy worker 404 routes the message 426 to service proxy worker 406. Service proxy worker 406 can, in response, reject the update request or route, e.g., by sending a service unavailable message 428 to service proxy worker 404. Service proxy worker 404 then routes the message 430 to SMF 402. Alternatively, service proxy worker 404 can route to another destination.

Figure 5:
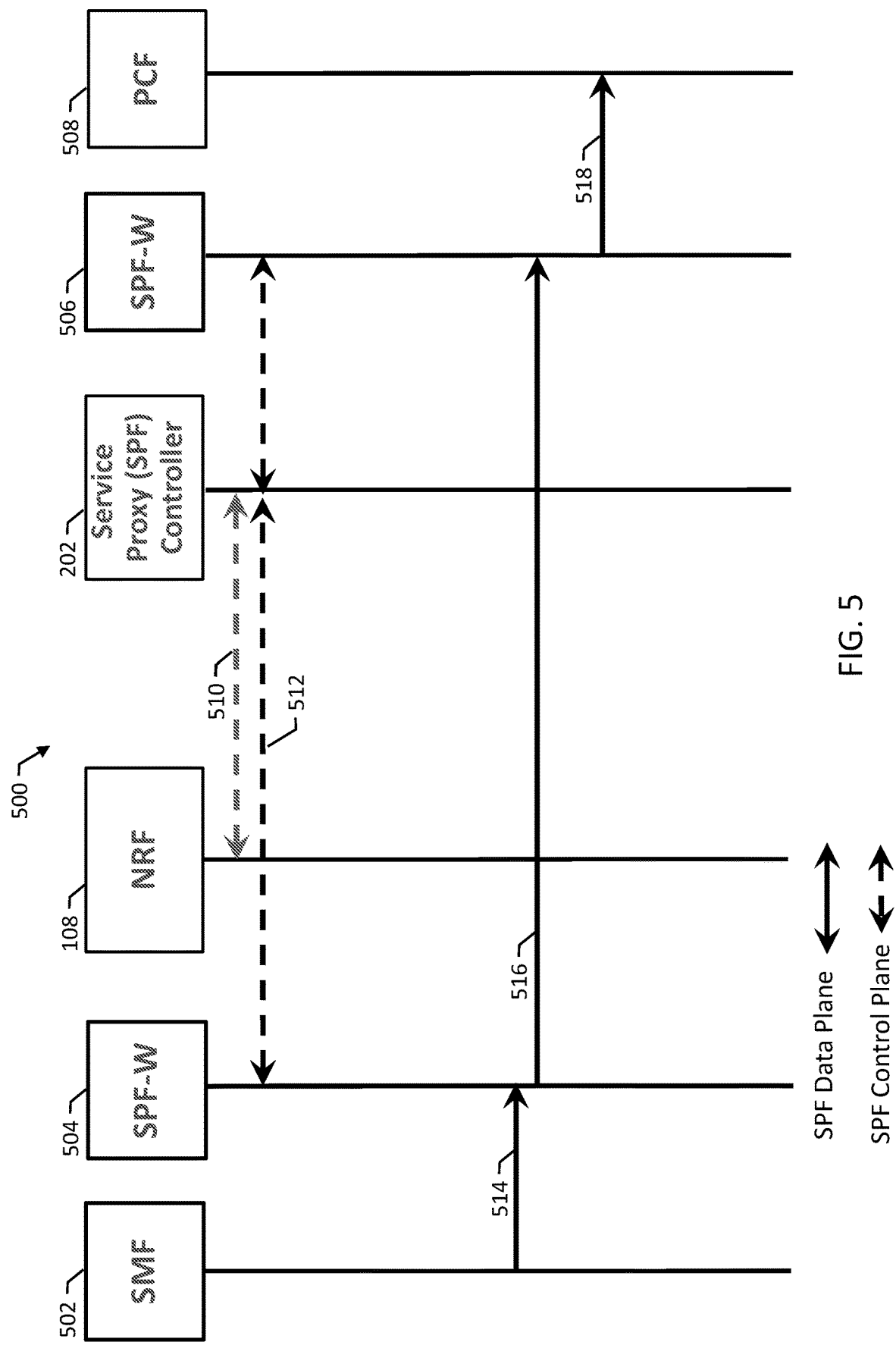
FIG. 5 is a signaling diagram illustrating an example message exchange for routing optimization carried out with the NRF.

FIG. 5 is a signaling diagram illustrating an example message exchange 500 for routing optimization carried out with the NRF. FIG. 5 shows an SMF instance 502, a service proxy worker 504, the NRF 108, the service proxy controller 202, another service proxy worker 506, and a PCF instance 508. The routing optimization can be performed, e.g., on a per-service basis.

Message exchange 500 begins with service proxy controller 202 exchanging messages 510 with NRF 108 for the purpose of routing optimization, e.g., without discovery. Service proxy controller 202 sends messages 512 to push routing policies to service proxy workers 404 and 406. The routing policies can be specific to the network functions attached to the given service proxy workers. For example, the routing policies for service proxy worker 504 are specific to SMF 502, and the routing policies for service proxy worker 506 are specific to PCF 508.

SMF 502 sends a service request message 514 without PCF discovery. Service proxy worker 504 inspects the service request and routes the request 516 to service proxy worker 506, addressed to PCF 508. Service proxy worker 506 routes the message 518 to PCF 508.

Figure 6:
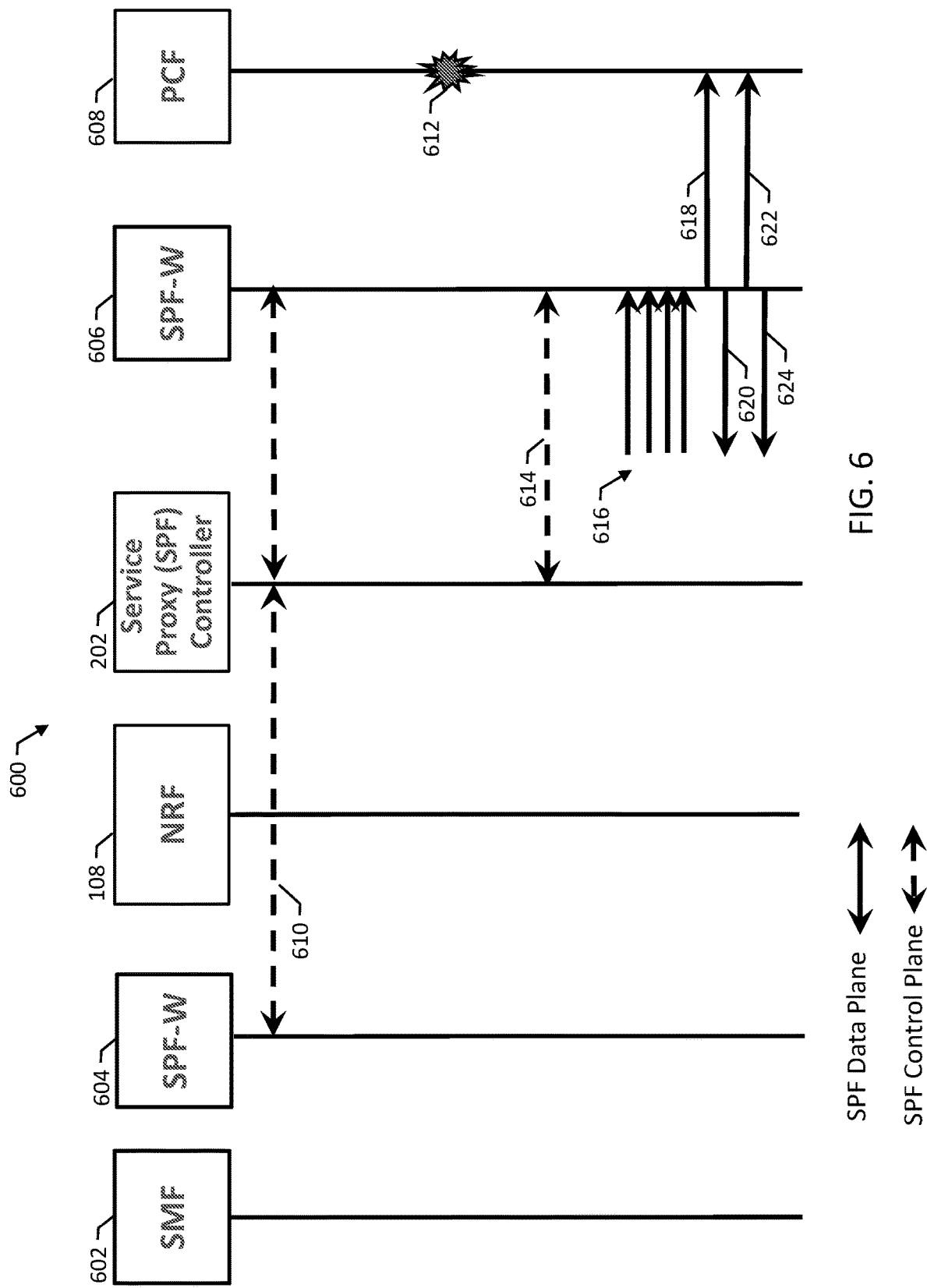
FIG. 6 is a signaling diagram illustrating an example message exchange for overload/egress congestion control.

FIG. 6 is a signaling diagram illustrating an example message exchange 600 for overload/egress congestion control. FIG. 6 shows an SMF instance 602, a service proxy worker 604, the NRF 108, the service proxy controller 202, another service proxy worker 606, and a PCF instance 608.

Message exchange 600 begins with service proxy controller 202 exchanging messages 610 with service proxy workers 604 and 606 to push routing policies. Then, PCF 608 becomes congested 612.

Service proxy worker 606 determines that PCF 608 is congested by monitoring telecommunications network core messages exchanged with PCF 608. Service proxy worker 606 exchanges messages 614 with service proxy controller 202 to inform the service proxy controller 202 that PCF 608 is congested and to send prioritization policies from service proxy controller 202 to service proxy worker 606.

Message exchange 600 continues with multiple service requests 616 being sent to service proxy worker 606 that are addressed to PCF 608. Service proxy worker 606 routes high priority requests 618 and 622 to PCF 608. Service proxy worker 606 rejects low priority requests 622 and 624 when no alternate servers are available, e.g., with 503 status, or service proxy worker 606 can divert some requests to alternate PCFs when available.

Egress can be based on capacity published during network function registration. Ingress controls can be based on, e.g., sudden increases in traffic rate.

Figure 7:
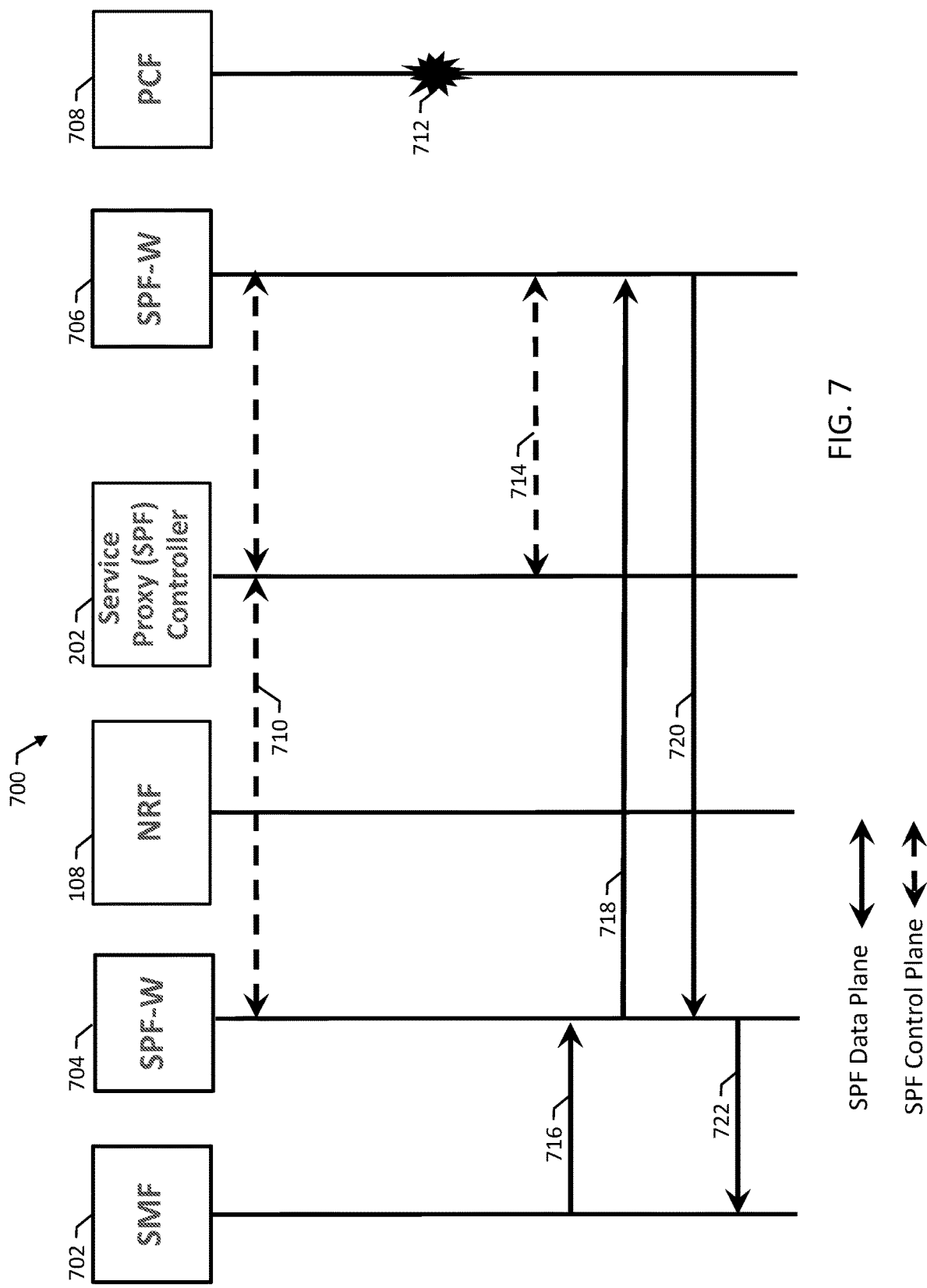
FIG. 7 is a signaling diagram illustrating an example message exchange for handling a network function failure or degradation.

FIG. 7 is a signaling diagram illustrating an example message exchange 700 for handling a network function failure or degradation. FIG. 7 shows an SMF instance 702, a service proxy worker 704, the NRF 108, the service proxy controller 202, another service proxy worker 706, and a PCF instance 708.

In the 5G architecture, for example, network functions are expected to be designed as cloud native microservices and when one consumer service synchronously invokes a service on the provider, there is a possibility that the provider service is unavailable or is exhibiting high latency. This may lead to resource exhaustion at the consumer, which would make the consumer service unable to handle other requests. The failure of one service can potentially cascade to other services within the network. Service proxy function 102 can potentially avoid such cascading failures by considering telecommunications network core messages, for example, as illustrated by message exchange 700.

Message exchange 700 begins with service proxy controller 202 exchanging messages 710 with NRF 108 to push routing policies. SMF 702 discovers PCF 708. Then, PCF 708 fails.

Service proxy worker 706 determines that PCF 708 has failed by monitoring telecommunications network core messages exchanged with PCF 708. Service proxy worker 706 exchanges messages 714 with service proxy controller 202 to inform the service proxy controller 202 that PCF 608 is congested, and service proxy controller 202 responds with no alternates.

Then, SMF 702 sends a message 716 to service proxy worker 704 requesting a service from PCF 708. Service proxy worker 704 routes the message 718 to service proxy worker 706. Service proxy worker 706 "opens circuit." Service proxy worker 706 responds to the request by sending a rejection message 720 to service proxy worker 704, e.g., with 503 status. Service proxy worker 704 routes the message 722 to SMF 702. If service proxy controller 202 determines alternate PCF instances, service proxy controller 202 can identify the alternate PCF instances to service proxy worker 706, and service proxy worker 706 can divert requests addressed to PCF 708 to the alternates.

Figure 8:
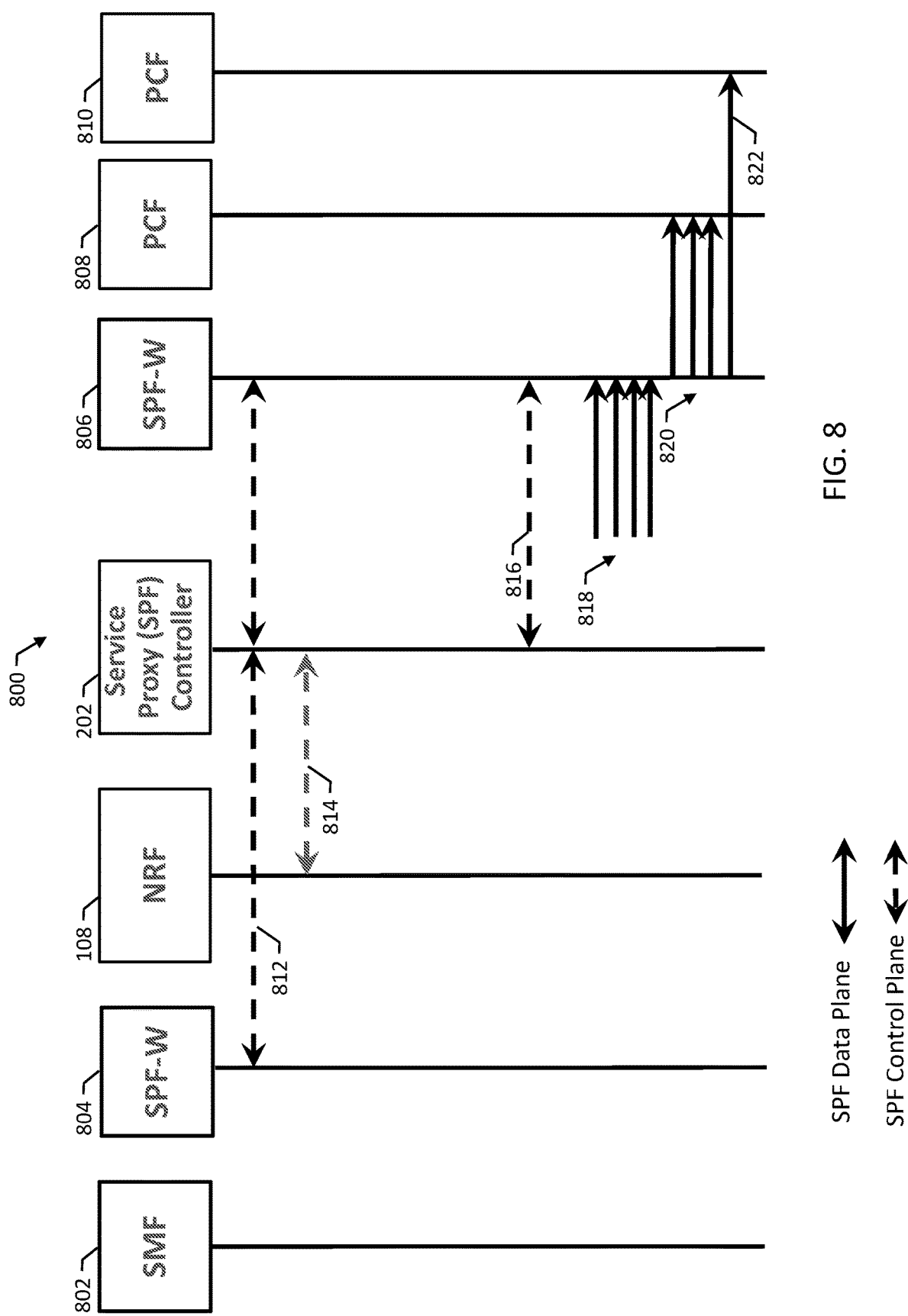
FIG. 8 is a signaling diagram illustrating an example message exchange for implementing canary releases.

FIG. 8 is a signaling diagram illustrating an example message exchange 800 for implementing canary releases. FIG. 8 shows an SMF instance 802, a service proxy worker 804, the NRF 108, the service proxy controller 202, another service proxy worker 806, a first PCF instance 808, and a second PCF instance 810.

Service proxy function 102 can play an important role in the roll out of new network function releases. Service proxy function 102 can support mechanisms that allow for a new release to be exposed to a fraction of the users or friendly users. Once successful, service proxy function 102 can slowly open up additional users to the new release in a controlled manner, providing confidence to the operator during the roll out. Service proxy function 102 can also facilitate blue-green deployments where operators can quickly stage a new network function release and after thorough testing, can roll over traffic in an instant to the newer release.

Message exchange 800 begins with service proxy controller 202 exchanging messages 812 with service proxy workers 804 and 806 to push routing policies. Service proxy controller 202 also exchanges messages 814 with NRF 108 to apply any appropriate NRF updates.

Then, a network operator configures a canary policy at service proxy controller 202. Policies can be, for example, static or based on supported versions. Service proxy controller 202 exchanges messages 816 with service proxy worker 806 to push the appropriate portions of the canary policy to service proxy worker 806.

In this example, the canary policy specifies that service proxy worker 806 is to distribute traffic addressed to PCF 808 across PCF 808 and PCF 810 in, e.g., a 75-25 ratio or other appropriate ratio. Service proxy worker 806 then receives multiple service requests 818 addressed to PCF 808. Service proxy worker 806 routes some of the service requests 820 to PCF 808 and the remaining service requests to PCF 810 in accordance with the canary policy.

Figure 9:
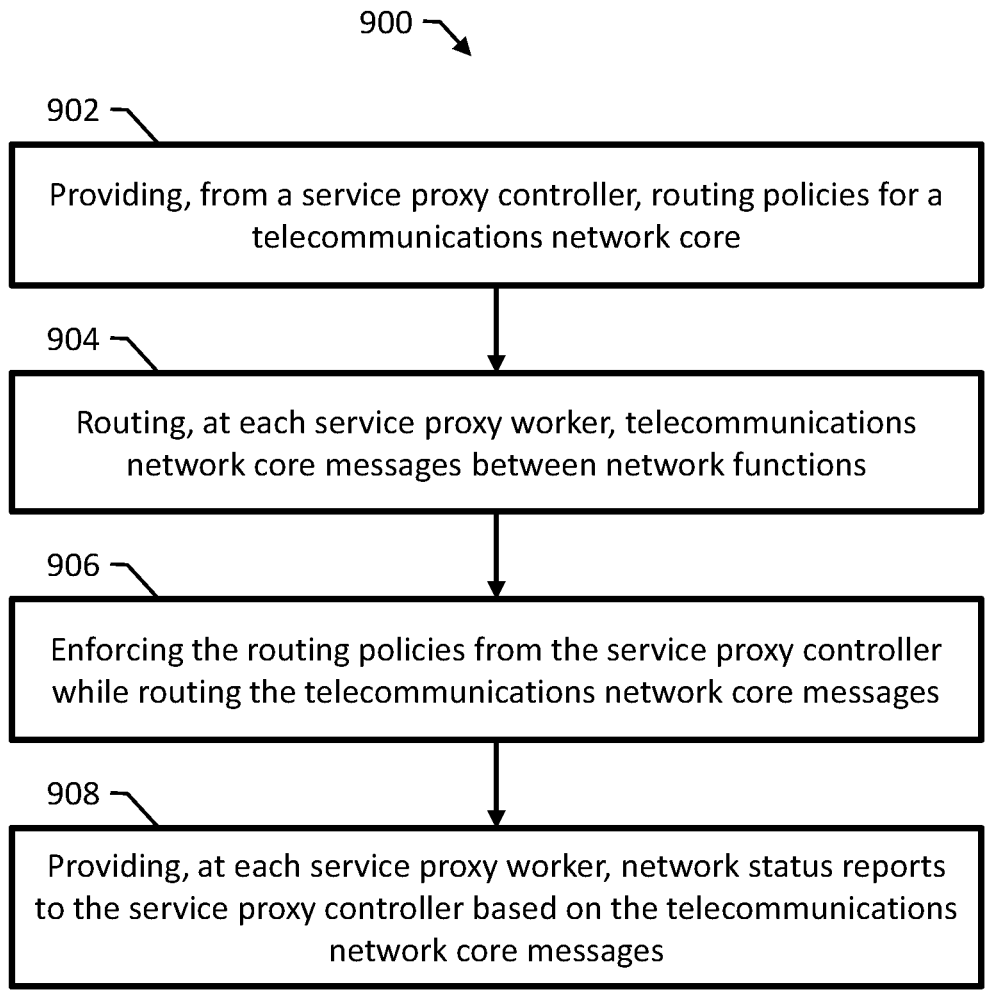
FIG. 9 is a flow diagram illustrating an example method for providing a service proxy function in a telecommunications network core using a service-based architecture.

FIG. 9 is a flow diagram illustrating an example method 900 for providing a service proxy function in a telecommunications network core using a service-based architecture. Method 900 can be performed, e.g., by the service proxy controller 202 and service proxy workers 204, 206, 208, and 210 of FIG. 2.

Method 900 includes providing, from a service proxy controller implemented on at least one processor, routing policies for a telecommunications network core, e.g., the telecommunications network core 100 of FIG. 1 (902). The telecommunications network core includes network functions communicating using a service-based architecture. For example, the telecommunications network core can be a 3GPP 5G telecommunications network core, and the network functions include at least an AMF, a PCF, a UDM function, a SMF, and a NSSF. In some examples, the network functions include one or more of: a unified data repository (UDR), an authentication server function (ASF), and a network function repository function (NRF).

Method 900 includes routing, at each service proxy worker of a number of service proxy workers implemented on the at least one processor, telecommunications network core messages between a respective subset of the network functions (904). Routing the telecommunications network messages includes consuming the routing policies from the service proxy controller and enforcing the routing policies from the service proxy controller while routing the telecommunications network core messages (906).

Method 900 includes providing, at each service proxy worker, network status reports to the service proxy controller based on the telecommunications network core messages (908). Method 900 can include receiving topology information, e.g., from the NRF and providing routing policies based on the topology information.

In some examples, providing routing policies includes performing load balancing between at least a first subset of network functions based on the network status reports from the service proxy workers. In some examples, routing telecommunications network core messages includes re-routing, at the service proxy worker, at least a first telecommunications network core message destined for a first network function based on a health status indicator for the first network function. In some examples, routing telecommunications network core messages includes re-trying, at the service proxy worker, a failed transmission of a first telecommunications network core message from a first network function to a second network function.

In some examples, the service proxy workers are deployed alongside instances of the network functions in a distributed computing system, and routing telecommunications network core messages includes acting as a default outbound proxy for the instances of the network functions. In some examples, providing routing policies for the telecommunications network core includes providing a traffic prioritization policy, and enforcing the routing policies includes shedding lower priority network traffic in response to detecting an overload condition according to the traffic prioritization policy.

In some examples, providing network status reports includes providing one or more of: request and response counts for each network function; a message rate for each network function; and an average transmission latency for each network function. In some examples, the service proxy controller is configured for determining a network load for at least a first network function based on: capacity information published by the first network function during registration; load information published by the first network function; and a first network status report characterizing the network load of the first network function.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for providing a service proxy function, the system comprising:
   a service proxy controller implemented on at least one processor, wherein the service proxy controller is configured for providing a plurality of routing policies for a telecommunications network core, the telecommunications network core comprising a plurality of network functions communicating using a service-based architecture; and
   a plurality of service proxy workers implemented on the at least one processor, wherein the service proxy workers are deployed alongside instances of the network functions in a distributed computing system and wherein the service proxy workers are distinct from the instances of the network functions, and wherein each service proxy worker of the service proxy workers is configured for:
      routing telecommunications network core messages between a respective subset of the network functions by consuming the routing policies from the service proxy controller and enforcing the routing policies from the service proxy controller, wherein routing telecommunications network core messages comprises acting as a default outbound proxy for one or more instances of a respective network function deployed alongside the service proxy worker; and
      providing network status reports to the service proxy controller based on the telecommunications network core messages.

2. The system of claim 1, wherein providing routing policies comprises performing load balancing between at least a first subset of network functions based on the network status reports from the service proxy workers.

3. The system of claim 1, wherein routing telecommunications network core messages comprises re-routing, at the service proxy worker, at least a first telecommunications network core message destined for a first network function based on a health status indicator for the first network function.

4. The system of claim 1, wherein routing telecommunications network core messages comprises re-trying, at the service proxy worker, a failed transmission of a first telecommunications network core message from a first network function to a second network function.

5. The system of claim 1, wherein providing routing policies for the telecommunications network core comprises receiving network function status information from a network repository function (NRF) and providing additional network function status information to the NRF.

6. The system of claim 1, wherein providing routing policies for the telecommunications network core comprises providing a traffic prioritization policy, and wherein enforcing the routing policies comprises shedding lower priority network traffic in response to detecting an overload condition according to the traffic prioritization policy.

7. The system of claim 1, wherein providing network status reports comprises providing one or more of: request and response counts for each network function; a message rate for each network function; and an average transmission latency for each network function.

8. The system of claim 1, wherein the service proxy controller is configured for determining a network load for at least a first network function based on: capacity information published by the first network function during registration; load information published by the first network function; and a first network status report characterizing the network load of the first network function.

9. The system of claim 1, wherein the telecommunications network core is a $3^{rd}$ Generation Partnership Project (3GPP) 5G telecommunications network core, and wherein the network functions include at least an access and mobility management function (AMF), a policy control function (PCF), a unified data management (UDM) function, a session management function (SMF), and a network slice selection function (NSSF).

10. A non-transitory computer readable medium having stored thereon executable instructions that when executed by a processor of a computer controls the computer to perform steps comprising:
   providing, from a service proxy controller implemented on at least one processor, a plurality of routing policies for a telecommunications network core, the telecommunications network core comprising a plurality of network functions communicating using a service-based architecture;
   routing, at each service proxy worker of a plurality of service proxy workers implemented on the at least one processor, telecommunications network core messages between a respective subset of the network functions by consuming the routing policies from the service proxy controller and enforcing the routing policies from the service proxy controller, wherein the service proxy workers are deployed alongside instances of the network functions in a distributed computing system, and wherein the service proxy workers are distinct from the instances of the network functions, and wherein routing telecommunications network core messages comprises acting as a default outbound proxy for one or more instances of a respective network function deployed alongside the service proxy worker; and
   providing, at each service proxy worker, network status reports to the service proxy controller based on the telecommunications network core messages.

11. A method for providing a service proxy function, the method comprising:
   providing, from a service proxy controller implemented on at least one processor, a plurality of routing policies for a telecommunications network core, the telecommunications network core comprising a plurality of network functions communicating using a service-based architecture;
   routing, at each service proxy worker of a plurality of service proxy workers implemented on the at least one processor, telecommunications network core messages between a respective subset of the network functions by consuming the routing policies from the service proxy controller and enforcing the routing policies from the service proxy controller, wherein the service proxy workers are deployed alongside instances of the network functions in a distributed computing system, and wherein the service proxy workers are distinct from the instances of the network functions, and wherein routing telecommunications network core messages comprises acting as a default outbound proxy for one or more instances of a respective network function deployed alongside the service proxy worker; and providing, at each service proxy worker, network status reports to the service proxy controller based on the telecommunications network core messages.

12. The method of claim 11, wherein providing routing policies comprises performing load balancing between at least a first subset of network functions based on the network status reports from the service proxy workers.

13. The method of claim 11, wherein routing telecommunications network core messages comprises re-routing, at the service proxy worker, at least a first telecommunications network core message destined for a first network function based on a health status indicator for the first network function.

14. The method of claim 11, wherein routing telecommunications network core messages comprises re-trying, at the service proxy worker, a failed transmission of a first telecommunications network core message from a first network function to a second network function.

15. The method of claim 11, wherein providing routing policies for the telecommunications network core comprises receiving network function status information from a network repository function (NRF) and providing additional network function status information to the NRF.

16. The method of claim 11, wherein providing routing policies for the telecommunications network core comprises providing a traffic prioritization policy, and wherein enforcing the routing policies comprises shedding lower priority network traffic in response to detecting an overload condition according to the traffic prioritization policy.

17. The method of claim 11, wherein providing network status reports comprises providing one or more of: request and response counts for each network function; a message rate for each network function; and an average transmission latency for each network function.

18. The method of claim 11, wherein the service proxy controller is configured for determining a network load for at least a first network function based on: capacity information published by the first network function during registration; load information published by the first network function; and a first network status report characterizing the network load of the first network function.

19. The method of claim 11, wherein the telecommunications network core is a $3^{rd}$ Generation Partnership Project (3GPP) 5G telecommunications network core, and wherein the network functions include at least an access and mobility management function (AMF), a policy control function (PCF), a unified data management (UDM) function, a session management function (SMF), and a network slice selection function (NSSF).

* * * * *

UNITED STATES PATENT AND TRADEMARK OFFICE
CERTIFICATE OF CORRECTION

| | | |
|---|---|---|
| PATENT NO. | : 10,778,527 B2 | Page 1 of 1 |
| APPLICATION NO. | : 16/176920 | |
| DATED | : September 15, 2020 | |
| INVENTOR(S) | : Assali et al. | |

It is certified that error appears in the above-identified patent and that said Letters Patent is hereby corrected as shown below:

On the Title Page

On page 2, Column 2, item (56) under Other Publications, Line 8, delete "16/369,691" and insert -- 16/527,988 --, therefor.

On page 2, Column 2, item (56) under Other Publications, Line 9, delete "System," and insert -- Systems, --, therefor.

On page 3, Column 1, item (56) under Other Publications, Line 35, delete "use" and insert -- user --, therefor.

On page 3, Column 1, item (56) under Other Publications, Line 35, delete "awareness," and insert -- awareness. --, therefor.

On page 3, Column 1, item (56) under Other Publications, Line 35, delete "Definiation" and insert -- Definition --, therefor.

On page 3, Column 1, item (56) under Other Publications, Line 41, after "and" insert -- for --.

On page 3, Column 2, item (56) under Other Publications, Line 70, delete "anf" and insert -- and --, therefor.

On page 4, Column 1, item (56) under Other Publications, Line 20, delete "Partnetship" and insert -- Partnership --, therefor.

In the Claims

In Column 15, Line 27, in Claim 15, before "repository" insert -- function --.

Signed and Sealed this
First Day of June, 2021

Drew Hirshfeld
*Performing the Functions and Duties of the
Under Secretary of Commerce for Intellectual Property and
Director of the United States Patent and Trademark Office*